March 24, 1936. L. B. HENDERSON 2,034,982
CONSTRUCTION OF MOTOR VEHICLE BODIES
Filed April 29, 1935 2 Sheets-Sheet 2
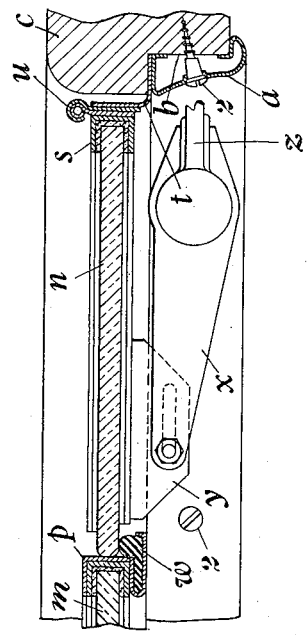
Fig. 3
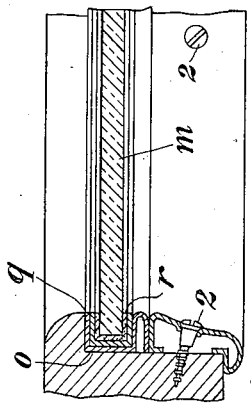
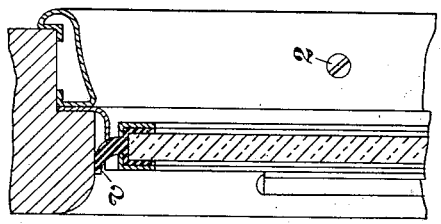
Fig. 2
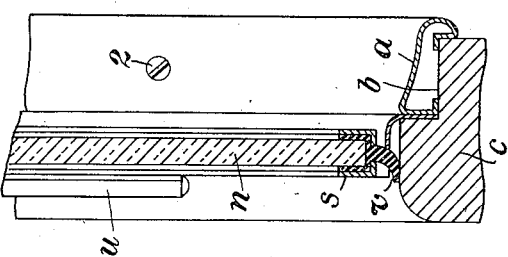
L. B. Henderson
INVENTOR
By Glascock Downing & Seebold
ATTYS Patented Mar. 24, 1936

2,034,982

UNITED STATES PATENT OFFICE 2,034,982

CONSTRUCTION OF MOTOR VEHICLE BODIES

Leonard Bayliffe Henderson, Oldbury, Birmingham, England, assignor to Accles and Pollock Limited, Oldbury, Birmingham, England Application April 29, 1935, Serial No. 18,893
In Great Britain May 9, 1934

2 Claims. (Cl. 296—44)

This invention relates to the construction of motor vehicle bodies, railway coaches and the like, and has for its object to facilitate the insertion in position of the window panes and parts associated therewith. Ordinarily the window panes are first fitted into position within the main or outer portons of the body work and are subsequently secured by mouldings or panels situated on the inner side of the body work. When the components above-mentioned are assembled on what is commonly termed a line, that is to say a system in which a succession of vehicle bodies are moved from one position to another at which different operations are performed on them, the above described method of fitting the windows often causes delay and consequent interference with the regular progression of the bodies along the line. By the present invention this risk of delay is avoided in a simple and convenient manner.

The invention comprises a construction in which the window pane or panes and retaining frame or frames, and associated parts form a unit which can be fitted into the body work of the vehicle as one piece.

In the accompanying sheets of explanatory drawings:—

Figure 2 is a cross section on the line 2—2 (Figure 1), and Figure 3 is a sectional plan on the line 3—3 (Figure 1).

Figure 1:
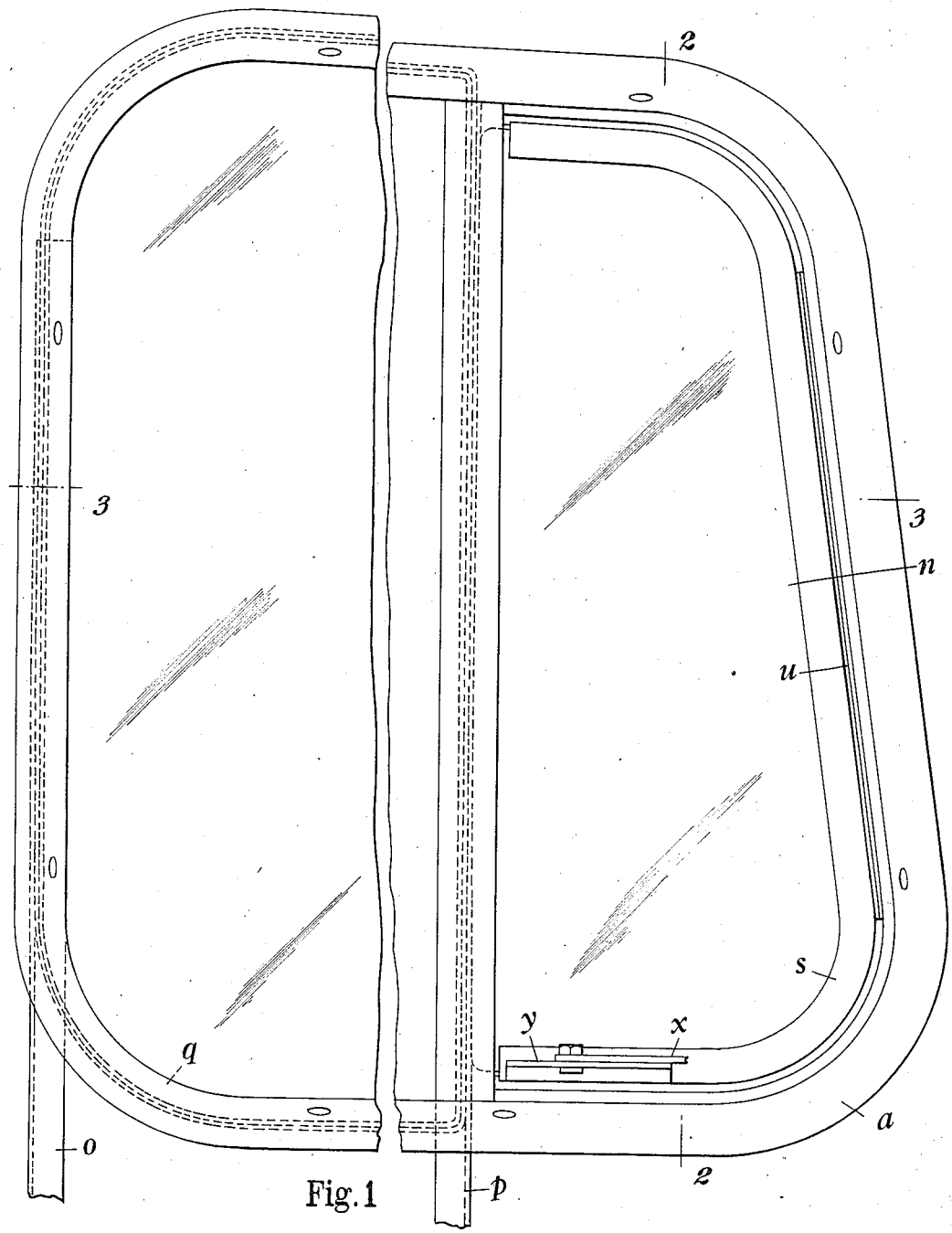
Figure 1 is a front elevation showing one form of window "unit" constructed in accordance with this invention.

As shown the main frame $a$ has combined with it a vertically slidable window pane $m$, and a pivoted pane $n$. The frame $a$, which is adapted to fit into a recess $b$ around an aperture in the body $c$ of the vehicle, has secured to one side of it (by welding or otherwise) a pair of vertical guide channels $o$, $p$. The pane $m$ has its edges enclosed in a sub-frame $q$ and sealing strip $r$, and the vertical edges of the sub-frame are arranged to slide in the guide channels $o$, $p$, any convenient means being provided for imparting raising and lowering movements to the pane $m$. The pane $n$ is carried in a sub-frame $s$ which extends around three edges only of the pane, and this sub-frame is attached along one edge to a strip $t$ by a hinge $u$, the strip $t$ being secured (by welding or otherwise) to the frame $a$.

To form a wind and rain proof seal between the upper and lower edges of the pane $n$ and the body of the vehicle the upper and lower edges of the sub-frame $s$ are provided with flexible rubber strips $v$, and to form a wind and rain proof seal between the free edge of the frame $s$ and the vertical bar $p$, the latter has secured to it a rubber strip $w$ against which the pane $n$ can abut when the pane is in the closed position. Any convenient means are provided for securing the pivoted pane $n$ in the closed or open position. In the example illustrated such means comprise an arm $x$ pivoted on the frame $a$ and having a pin and slot connection with a member $y$ on the sub-frame $s$, a finger lever $z$ serving to lock the arm $x$ in any desired position.

The parts above described are all first assembled to form a window unit, and when assembled they are ready to be mounted on the vehicle body without further fitting or other adaptation of any other components, the unit being secured in position by screws $2$ inserted into the vehicle body through the frame $a$.

By the construction of windows in the manner above described, the ordinary necessity for performing any fitting operations on the various components associated with the panes while vehicle bodies are on the assembly line is avoided, and the risk of delay and congestion which ordinarily exists is eliminated.

The invention is not limited to the example above described as subordinate details may be varied to suit different requirements.

Having thus described my invention what I claim as new and desire to secure by Letters Patent is:—

1. A vehicle window structure comprising the combination of a main frame, a pair of vertical guides on the said frame, a sub-frame pivoted on the said frame, panes carried by the guides and sub-frame, the assembled parts forming a unit construction which can be fitted into the body of the vehicle as one piece, substantially as described.

2. In a vehicle window structure as claimed in claim 1, rubber strips projecting edgewise from the upper and lower edges of the sub-frame so as to form a wind and rain proof seal between the said edges and the body of the vehicle, and another rubber strip secured to one of the guides so as to form an abutment for a free edge of the pane carried by the sub-frame, substantially as described.

LEONARD BAYLIFFE HENDERSON.